United States Patent
Wang et al.

(10) Patent No.: US 11,979,766 B2
(45) Date of Patent: May 7, 2024

(54) MEASUREMENT GAP CONFIGURATION METHOD AND APPARATUS, AND TERMINAL DEVICE AND NETWORK DEVICE

(71) Applicant: GUANGDONG OPPO MOBILE TELECOMMUNICATIONS CORP., LTD., Dongguan (CN)

(72) Inventors: Shukun Wang, Dongguan (CN); Rongyi Hu, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 18/210,251

(22) Filed: Jun. 15, 2023

(65) Prior Publication Data

US 2023/0328571 A1 Oct. 12, 2023

Related U.S. Application Data

(63) Continuation of application No. PCT/CN2021/078531, filed on Mar. 1, 2021.

(51) Int. Cl.
*H04W 24/10* (2009.01)

(52) U.S. Cl.
CPC .................... *H04W 24/10* (2013.01)

(58) Field of Classification Search
CPC ...................................................... H04W 24/10
See application file for complete search history.

(56) References Cited

U.S. PATENT DOCUMENTS

| | | | | |
|---|---|---|---|---|
| 2013/0016690 | A1* | 1/2013 | Jeong | H04W 24/10 370/329 |
| 2014/0010189 | A1* | 1/2014 | Tian | H04W 24/10 370/329 |
| 2014/0094162 | A1* | 4/2014 | Heo | H04W 40/246 455/422.1 |
| 2019/0124558 | A1* | 4/2019 | Ang | H04W 36/06 |
| 2019/0364602 | A1* | 11/2019 | Yi | H04W 74/0833 |
| 2020/0162957 | A1  | 5/2020 | Zhang et al. | |
| 2020/0288494 | A1* | 9/2020 | Heo | H04W 72/20 |

(Continued)

FOREIGN PATENT DOCUMENTS

| | | | |
|---|---|---|---|
| CN | 109756995 A | 5/2019 | |
| CN | 109803304 A | 5/2019 | |

(Continued)

OTHER PUBLICATIONS

Intel Corporation, Apple, "Motivation for introduction of a new R17 SI/WI on measurement gap enhancements", 3GPP TSG RAN Meeting #87e RP-200332, Electronic Meeting, Mar. 16-19, 2020.

(Continued)

*Primary Examiner* — Walli Z Butt
*Assistant Examiner* — Thad N Defauw
(74) *Attorney, Agent, or Firm* — BAYES PLLC

(57) ABSTRACT

Provided is a method for configuring a measurement gap. A terminal device receives first configuration information from a network device, wherein the first configuration information is used for determining at least one pre-configured measurement gap, and each of the at least one pre-configured measurement gap is associated with a measurement gap index.

18 Claims, 12 Drawing Sheets

(56) References Cited

U.S. PATENT DOCUMENTS

| | | | |
|---|---|---|---|
| 2021/0029768 A1* | 1/2021 | Shih | H04W 36/0079 |
| 2021/0385681 A1* | 12/2021 | Li | H04W 72/044 |
| 2022/0174623 A1 | 6/2022 | Zheng | |
| 2022/0394575 A1* | 12/2022 | Wang | H04W 36/0085 |

FOREIGN PATENT DOCUMENTS

| | | |
|---|---|---|
| CN | 111132220 A | 5/2020 |
| CN | 111372303 A | 7/2020 |
| EP | 4017078 A1 | 6/2022 |
| WO | 2019100396 A1 | 5/2019 |
| WO | 2020086514 A1 | 4/2020 |
| WO | 2021031921 A1 | 2/2021 |

OTHER PUBLICATIONS

Huawei, HiSilicon, "Further discussion on gap sharing", 3GPP TSG-RAN WG4 Meeting #88, R4-1810695, Gothenburg, SE, Aug. 20-24, 2018.
International Search Report in the international application No. PCT/CN2021/078531, dated Sep. 28, 2021.
Written Opinion of the International Search Authority in the international application No. PCT/CN2021/078531, dated Sep. 28, 2021.
Intel Corporation, MediaTek Inc. "New WI Proposal: NR measurement gap enhancements", 3GPP TSG RAN Meeting #89e, RP-202119, E-meeting, Sep. 14-18, 2020.
3GPP TS 38.331 V16.3.1 (Jan. 2021), "3rd Generation Partnership Project; Technical Specification Group Radio Access Network; NR; Radio Resource Control (RRC) protocol specification (Release 16)".
OPPO, "Views on pre-configured MG pattern(s) for NR_MG_enh", 3GPP TSG-RAN WG4 Meeting #98-e R4-2101537 Electronic Meeting, Jan. 25-Feb. 5, 2021, the whole document. 4 pages.
CMCC, "Discussion on pre-configured MG pattern(s)", 3GPP TSG-RAN WG4 Meeting #98-e R4-2100871 Electronic Meeting, Jan. 25-Feb. 5, 2021, the whole document. 2 pages.
Huawei et al, "Initial discussion on (de)activation of pre-configured MGs", 3GPP TSG-RAN WG4 Meeting #98-e R4-2102810 Electronic Meeting, Jan. 25-Feb. 5, 2021, the whole document. 4 pages.
3GPP TS 38.133 V17.0.0 (Dec. 2020), 3rd Generation Partnership Project; Technical Specification Group Radio Access Network; NR; Requirements for support of radio resource management (Release 17). pp. 42-422, XP051999669, paragraph 9.1.2. 1630 pages.
Supplementary European Search Report in the European application No. 21928432.0, mailed on Dec. 13, 2023. 10 pages.

* cited by examiner

A network device transmits first configuration information to a terminal device, and the terminal device receives the first configuration information from the network device. The first configuration information is used for determining at least one pre-configured measurement gap, and each of the at least one pre-configured measurement gap is associated with a measurement gap index — 701

FIG. 7

Apparatus for configuring a measurement gap

Transmitting unit 901

FIG. 9

MEASUREMENT GAP CONFIGURATION METHOD AND APPARATUS, AND TERMINAL DEVICE AND NETWORK DEVICE

CROSS-REFERENCE TO RELATED APPLICATION

This application is a continuation of International Patent Application No. PCT/CN2021/078531 filed on Mar. 1, 2021, which is hereby incorporated by reference in its entirety.

BACKGROUND

A network side can configure dedicated Band Width Parts (BWP) of one or more serving cells for a terminal device. For each serving cell, the serving cell can be configured with one or more dedicated BWPs, and only one dedicated BWP can be activated at a time. For a serving cell, if the serving cell is configured with a plurality of dedicated BWPs, its activated dedicated BWP can be switched among the plurality of dedicated BWPs.

However, the activated dedicated BWPs of the serving cells are different, which may result in changes of whether measurement for a frequency point requires a measurement gap. In other words, the number of frequency points measured using a measurement gap may also change. Therefore, configuring a measurement gap according to a User Equipment (UE) granularity results in poor flexibility, and how to configure the measurement gap needs to be further improved.

SUMMARY

Embodiments of the present disclosure relates to the technical field of mobile communications, and in particular to a method and an apparatus for configuring a measurement gap, a terminal device and a network device.

The method for configuring a measurement gap provided by the embodiments of the present disclosure includes the following operations.

A terminal device receives first configuration information from a network device, the first configuration information being used for determining at least one pre-configured measurement gap, and each of the at least one pre-configured measurement gap being associated with a measurement gap index.

The method for configuring a measurement gap provided by the embodiments of the present disclosure includes the following operations.

A network device transmits first configuration information to a terminal device, the first configuration information being used for determining at least one pre-configured measurement gap, and each of the at least one pre-configured measurement gap being associated with a measurement gap index.

A terminal device provided by the embodiments of the present disclosure includes a processor and a transceiver. The processor is configured to cooperate with the transceiver to perform the above method for configuring a measurement gap.

A network device provided by the embodiments of the present disclosure includes a processor and a transceiver. The processor is configured to cooperate with the transceiver to perform the above method for configuring a measurement gap.

BRIEF DESCRIPTION OF THE DRAWINGS

The accompanying drawings illustrated herein are used to provide further understanding of the present disclosure and constitute a part of the present disclosure, and illustrative embodiments of the present disclosure and their description are used to explain the present disclosure, but do not constitute improper limitation to the present disclosure. In the accompanying drawings:

FIG. 7 is a schematic flowchart of a method for configuring a measurement gap provided by an embodiment of the present disclosure.

FIG. 9 is a second schematic structural composition diagram of an apparatus for configuring a measurement gap provided by the embodiment of the present disclosure.

DETAILED DESCRIPTION

The technical solution of the embodiments of the present disclosure will be described below in conjunction with the drawings in the embodiments of the present disclosure, and it will be apparent that the described embodiments are part of the embodiments of the present disclosure, but not all of them. Based on the embodiments in the present disclosure, all other embodiments obtained by those of ordinary skill in the art without creative work fall within the scope of protection of the present disclosure.

The technical solution of the embodiments of the present disclosure may be applied to various communication systems, such as long term evolution (LTE) system, LTE frequency division duplex (FDD) system, LTE time division duplex (TDD) system, 5G communication system or future communication system, etc.

Figure 1:
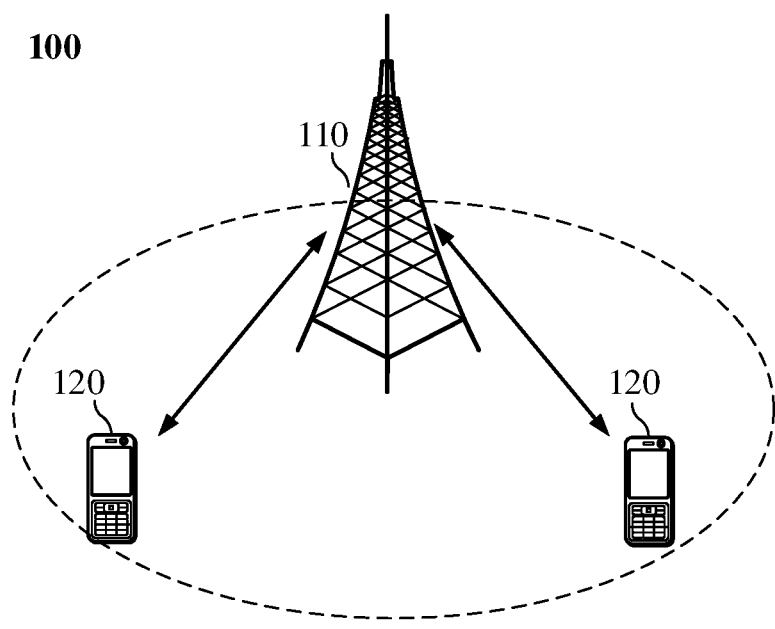
FIG. 1 is a schematic diagram of a communication system architecture provided by an embodiment of the present disclosure.

Exemplarily, FIG. 1 illustrates a communication system 100 applied in the embodiments of the present disclosure. The communication system 100 may include a network device 110, which may be a device that communicates with a terminal 120 (or referred to as a communication terminal or a terminal). The network device 110 may provide communication coverage for a particular geographic area and may communicate with terminals located within the coverage area. Optionally, the network device 110 may be an evolution NodeB (eNB or eNodeB) in an LTE system, or a wireless controller in a cloud radio access network (CRAN), or the network device may be a mobile switching center, a relay station, an access point, an in-vehicle device, a wearable device, a hub, a switch, a bridge, a router, a network-side device in a 5G network or a network device in a future communication system, etc.

The communication system 100 also includes at least one terminal 120 located within the coverage area of the network device 110. "Terminal" as used herein includes, but is not limited to, a connection via a wired line, such as via a public switched telephone network (PSTN), a digital subscriber line (DSL), a digital cable, a direct cable connection; and/or another data connection/network; and/or via a wireless interface such as a cellular network, a wireless local area network (WLAN), a digital television network such as a DVB-H network, a satellite network, an AM-FM broadcast transmitter; and/or a device of another terminal arranged to receive/send a communication signal; and/or Internet of Things (IoT) devices. A terminal arranged to communicate through a wireless interface may be referred to as "a wireless communication terminal", "a wireless terminal", or "a mobile terminal". Examples of mobile terminals include, but are not limited to satellite or cellular phones; personal communications system (PCS) terminals that may combine cellular radio telephones with data processing, facsimile, and data communication capabilities; PDA which may include radio telephones, pagers, Internet/Intranet access, Web browsers, notebooks, calendars, and/or global positioning system (GPS) receivers; and conventional laptop and/or handheld receivers or other electronic devices including radio telephone transceivers. The terminal may refer to an access terminal, user equipment (UE), a subscriber unit, a subscriber station, a mobile station, a mobile platform, a remote station, a remote terminal, a mobile device, a user terminal, a terminal, a wireless communication device, a user agent, or a user device. The access terminal may be a cellular phone, a cordless phone, a session initiation protocol (SIP) telephone, a wireless local loop (WLL) station, a personal digital assistant (PDA), a handheld device with wireless communication function, a computing device or other processing device connected to wireless modem, an in-vehicle device, a wearable device, a terminal in 5G network or a terminal in the future evolved public land mobile network (PLMN), etc.

Optionally, device to device (D2D) communication may be performed between the terminals 120.

Optionally, the 5G communication system or 5G network may also be referred to as a new radio (NR) system or an NR network.

FIG. 1 exemplarily illustrates a network device and two terminals. Optionally, the communication system 100 may include multiple network devices and other numbers of terminals may be included within the coverage of each network device, which is not limited thereto by the embodiments of the present disclosure.

Optionally, the communication system 100 may also include other network entities such as network controllers, mobility management entities and the like, which are not limited by the embodiments of the present disclosure.

It should be understood that a device having a communication function in a network/system in the embodiments of the present disclosure may be referred to as a communication device. Taking the communication system 100 illustrated in FIG. 1 as an example, the communication device may include a network device 110 and terminals 120 having a communication function, the network device 110 and the terminals 120 may be specific devices described above and will not be described here. The communication device may also include other devices in the communication system 100 such as network controllers, mobility management entities and other network entities, which are not limited in the embodiments of the present disclosure.

It should be understood that the terms "system" and "network" of the present disclosure are often used interchangeably herein. In the present disclosure, the term "and/or" is used to describe an association relationship of associated objects, and represents that there may be three relationships. For example, A and/or B may represent the following three situations: i.e., independent existence of A, existence of both A and B and independent existence of B. In addition, the character "/" in the present disclosure generally represents that an "or" relationship is formed between the previous and next associated objects.

In order to facilitate understanding of the technical solution of the embodiments of the present disclosure, the technical solution related to the embodiments of the present disclosure is described below.

With people's pursuit of speed, latency, high-speed mobility and energy efficiency, as well as the diversity and complexity of services in future life, the $3^{rd}$ generation partnership project (3GPP) international standards organization began to develop 5G. The main application scenarios of 5G include enhanced mobile broadband (eMBB), ultra-reliable low-latency communications (URLLC) and massive machine-type communications (mMTC).

On the one hand, eMBB still aims at acquisition of multimedia content, services and data for users, and its demand is growing rapidly. On the other hand, eMBB may be deployed in different scenarios, such as indoors, in urban areas, in rural areas etc., capabilities and requirements thereof are quite different, and thus it cannot be generalized and must be analyzed in detail in combination with specific deployment scenarios. Typical applications for URLLC include: industrial automation, power automation, remote medical operations (surgery), traffic safety protection and so on. The typical characteristics of mMTC include: high connection density, small data volume, delay-insensitive services, low cost and long service lifetime of modules, etc.

In the early deployment of NR, it is difficult to obtain complete NR coverage, so the typical network coverage is wide-area LTE coverage and NR island coverage mode. Moreover, a large number of LTE are deployed below 6 GHz, and there are few spectrums below 6 GHz available for 5G. Therefore, NR must study the spectrum application above 6 GHz, but the high frequency band has limited coverage and fast signal fading. At the same time, in order to protect the early investment of mobile operators in LTE, a working mode of tight interworking between LTE and NR is proposed.

In order to realize the 5G network deployment and commercial application as soon as possible, 3GPP firstly completes the first 5G version, that is, LTE-NR Dual Connectivity (EN-DC). In an EN-DC, an LTE base station (eNB) serves as a master node (MN) and an NR base station (gNB or en-gNB) serves as a secondary node (SN), which are connected to an EPC core network. In the later stage of R15, other DC modes will be supported, namely NE-DC, 5GC-EN-DC and NR DC. In an NE-DC, an NR base station serves as the MN and an eLTE base station serves as the SN, which are connected to a 5GC core network. In a 5GC-EN-DC, an eLTE base station serves as the MN and an NR base station serves as the SN, which are connected to the 5GC core network. In an NR DC, an NR base station serves as the MN and an NR base station serves as the SN, which are connected to a 5GC core network.

Figure 2:
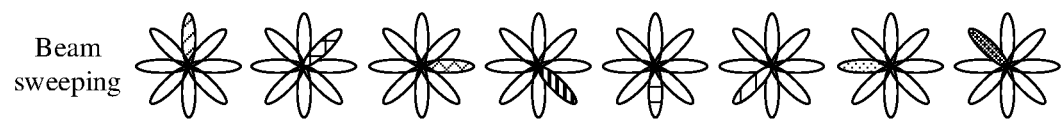
FIG. 2 is a schematic diagram of a beam sweeping provided by an embodiment of the present disclosure.
Figure 3:
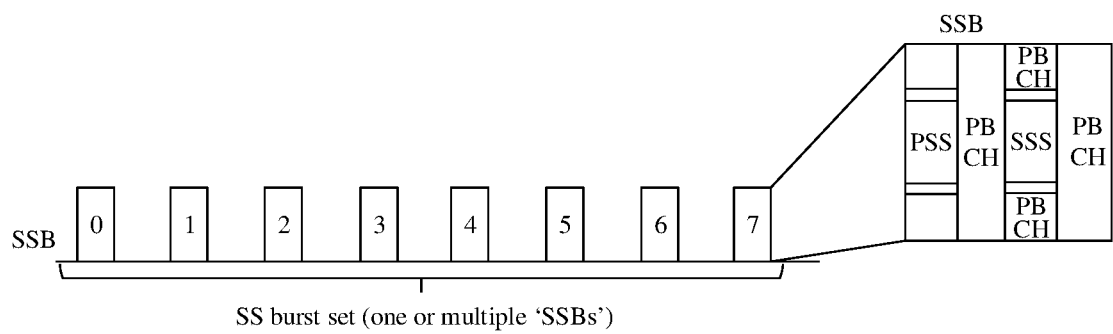
FIG. 3 is a schematic diagram of SSBs provided by an embodiment of the present disclosure.
Figure 4:
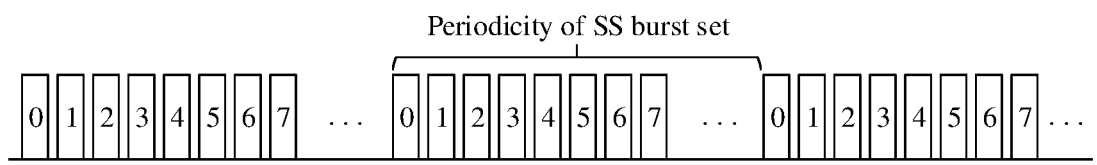
FIG. 4 is a schematic diagram of a period of SSB burst set provided by an embodiment of the present disclosure.

NR may also be deployed independently. NR will be deployed at high frequency in the future. In order to improve coverage, a mechanism of beam sweeping is introduced in 5G to meet the coverage requirements (space for coverage and time for space), as illustrated in FIG. 2. After the introduction of beam sweeping, synchronization signals need to be sent at each beam direction. Synchronization signals of 5G are provided in the form of SS/PBCH block (SSB), including Primary Synchronization Signal (PSS), Secondary Synchronization Signal (SSS) and Physical Broadcast Channel (PBCH), as illustrated in FIG. 3. The synchronization signals of 5G appear periodically in time domain in the form of SS burst set, as illustrated in FIG. 4.

The number of beams transmitted actually in each cell is determined by configuration at a network side, but a frequency point where the cell is located determines the maximum number of beams that may be configured, as illustrated in Table 1 below.

TABLE 1

| Frequency range | L (maximum number of beams) |
|---|---|
| greater than 3 (2.4) GHz | 4 |
| 3 (2.4) GHz-6 GHz | 8 |
| 6 GHz-52.6 GHz | 64 |

In a Radio Resource Management (RRM) measurement, measurement of signal may be an SSB measurement, i.e. an SSS signal or a Demodulation Reference Signal (DMRS) signal of a PBCH in an SSB is measured to obtain a beam measurement result and a cell measurement result. In addition, a terminal device in a Radio Resource Control (RRC) connected state may configure a Channel Status Indicator Reference Signal (CSI-RS) as a reference signal for cell measurement.

Figure 5:
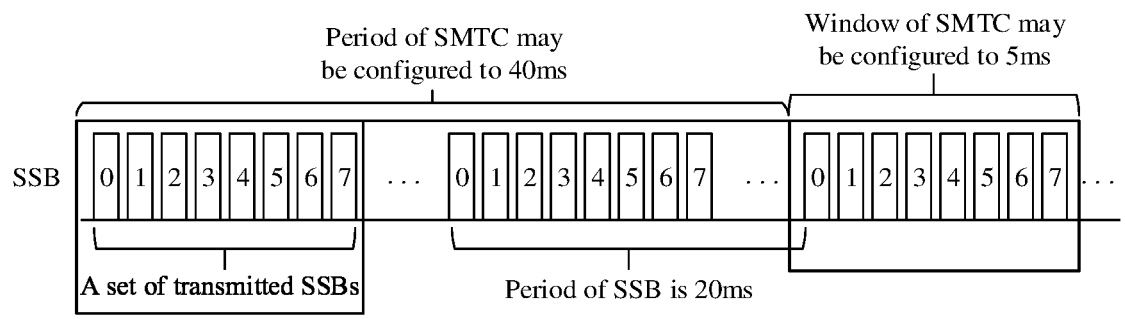
FIG. 5 is a schematic diagram of an SMTC provided by an embodiment of the present disclosure.

For an SSB-based measurement, locations of the SSBs actually transmitted of each cell may be different, and a period of the SS burst set may also be different. Therefore, in order to save energy in a measurement process of a terminal device, the network side configures SS/PBCH block measurement timing configuration (SMTC) for the terminal device, and the terminal device only needs to measure in a window of SMTC, as illustrated in FIG. 5.

Since the locations of the SSBs actually transmitted of each cell may be different, in order to enable the terminal device to find a location of the SSB actually transmitted as soon as possible, the network side will also configure the terminal device with an actual SSB transmission location to be measured by UE, for example, a union of locations of the SSBs actually transmitted of all measured cells. For example, at 3-6 GHz, the network side indicates that a bit map is 10100110, through which the terminal device is informed to measure only SSBs with SSB indexes being 0, 2, 5 and 6 among 8 candidate locations of SSBs.

The RRM measurement includes intra-frequency measurement and inter-frequency measurement. For inter-frequency measurement, a measurement gap configuration may be required. As illustrated in Table 2 below, the measurement gap configuration includes the following information: measurement gap repetition period (MGRP), measurement gap offset (GapOffset), measurement gap length (MGL), measurement gap timing advance (MGTA), and so on.

TABLE 2

```
GapConfig ::=                SEQUENCE {
    gapOffset                    INTEGER (0..159),
    mgl                          ENUMERATED {ms1dot5, ms3, ms3dot5, ms4,
ms5dot5, ms6},
    mgrp                         ENUMERATED {ms20, ms40, ms80, ms160},
    mgta                         ENUMERATED {ms0, ms0dot25, ms0dot5},
    ...,
    [[
    refServCellIndicator         ENUMERATED {pCell, pSCell, mcg-FR2}
OPTIONAL   -- Cond NEDCorNRDC
    ]]
}
```

Figure 6:
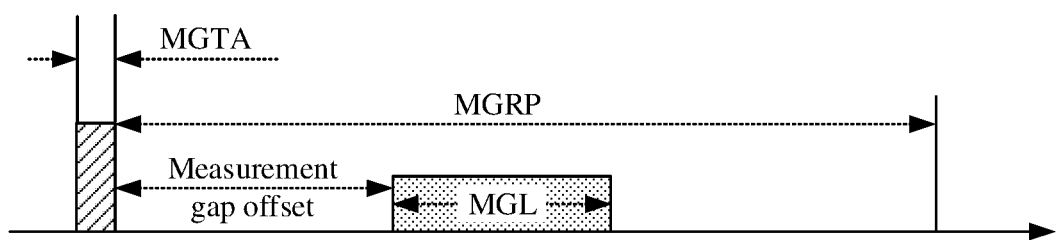
FIG. 6 is a schematic diagram of a measurement gap provided by an embodiment of the present disclosure.

Each piece of information in the measurement gap configuration may be illustrated with reference to FIG. 6. MGRP represents a period in which the measurement gap is repeated, GapOffset represents an offset of a starting position of starting the measurement gap with respect to a starting position of starting an MGRP, MGL represents a time length of the measurement gap, and MGTA is used to determine the timing of the measurement gap.

For a terminal device in the RRC connected state, if inter-frequency measurement or inter-system measurement is to be performed, it is necessary to configure a measurement gap on the network side, and during a duration of the measurement gap, the terminal device stops all services and measurements of serving cells. In addition, a measurement gap may also be required for the intra-frequency measurement.

NR supports a measurement gap configured by UE granularity (i.e., configured per UE) and a measurement gap configured by FR granularity (i.e., configured per FR). A related configuration of the measurement gap configured per UE may also be referred to as per-UE gap configuration, and a related configuration of the measurement gap configured per FR may also be referred to as per-FR gap configuration.

For per-UE gap configuration:
MN determines a per-UE gap configuration and associated gap sharing configuration. Further, MN sends the per-UE gap configuration to the terminal device, and MN further notifies SN about the per-UE gap configuration and a gap purpose (e.g. per-UE). Further, SN notifies MN about an FR1 frequency list and an FR2 frequency list to be configured by the SN as gap configuration assistance information.

For per-FR gap configuration:
1) For NG-DC or EN-DC: MN determines an FR1 gap configuration and associated gap sharing configuration; SN determines an FR2 gap configuration and associated gap sharing configuration. Further, MN sends a per FR1 gap configuration to the terminal device, and MN notifies SN about the per FR1 gap configuration and a gap purpose (e.g. per-FR1). Further, MN notifies SN about an FR2 frequency list to be configured by the MN as gap configuration assistance information, and SN notifies MN about an FR1 frequency list to be configured by the SN as gap configuration assistance information.

2) For NE-DC and NR-DC, MN determines the FR1 gap configuration and associated gap sharing configuration as well as the FR2 gap configuration and associated gap sharing configuration at the same time. Further, for the NE-DC, the MN notifies SN about the per FR1 gap configuration, and the SN provides MN with a gap demand request but does not require any frequency list. For the NR-DC, MN notifies SN about the per FR1 gap configuration, the per FR2 gap configuration and the gap purpose, and SN may indicate to MN about the FR1 frequency list and the FR2 frequency list to be configured by the SN.

There are many types of measurement gaps, and configurations of 24 gap patterns are provided in Table 3 below. Different gap patterns correspond to different measurement periods (i.e. MGRP) and different measurement time lengths (i.e. MGL). Some gap patterns are used for measuring frequency points in FR1, while others are used for measuring frequency points in FR2.

TABLE 3

| gap pattern id | measurement gap length (MGL, ms) | measurement gap repetition period (MGRP, ms) |
| --- | --- | --- |
| 0 | 6 | 40 |
| 1 | 6 | 80 |
| 2 | 3 | 40 |
| 3 | 3 | 80 |
| 4 | 6 | 20 |
| 5 | 6 | 160 |
| 6 | 4 | 20 |
| 7 | 4 | 40 |
| 8 | 4 | 80 |
| 9 | 4 | 160 |
| 10 | 3 | 20 |
| 11 | 3 | 160 |
| 12 | 5.5 | 20 |
| 13 | 5.5 | 40 |
| 14 | 5.5 | 80 |
| 15 | 5.5 | 160 |
| 16 | 3.5 | 20 |
| 17 | 3.5 | 40 |
| 18 | 3.5 | 80 |
| 19 | 3.5 | 160 |
| 20 | 1.5 | 20 |
| 21 | 1.5 | 40 |
| 22 | 1.5 | 80 |
| 23 | 1.5 | 160 |

In NR, the measurement gap is configured to the terminal device by RRC dedicated signaling, and the measurement gap is configuration parameters per UE.

In 5G, a maximum channel band width may be 400 MHZ (called a wideband carrier), which is very large compared with LTE's maximum band width of 20 MHZ. If a terminal device keeps operating on the wideband carrier, a power consumption of the terminal device is very large. Therefore, it is suggested that a Radio Frequency (RF) band width of the terminal device may be adjusted according to an actual throughput of the terminal device. Therefore, a concept of BWP is introduced, and the motivation of BWP is to optimize the power consumption of terminal device. For example, if a speed requirement of the terminal device is very low, a smaller BWP may be configured for the terminal device. If the speed requirement of the terminal device is very high, a larger BWP may be configured for the terminal device. If the terminal device supports high rate or operates in Carrier Aggregation (CA) mode, multiple BWPs may be configured for the terminal device. Another purpose of BWP is to trigger the coexistence of multiple basic numerologies in a cell, for example, BWP1 corresponds to numerology 1 and BWP2 corresponds to numerology 2.

A terminal device in an idle state or inactive state resides on an initial BWP, the initial BWP is visible to the terminal device in the idle state or inactive state, and the terminal device may obtain Master Information Block (MIB), Remaining Minimum System Information (RMSI), Other System Information (OSI), paging and other information from the initial BWP.

For a terminal device in an RRC connected state, the terminal device may be configured with up to 4 uplink BWPs and up to 4 downlink BWPs through RRC dedicated signaling, but only one uplink BWP and one downlink BWP may be activated at a time. The first activated BWP of the configured BWPs may be indicated in the RRC dedicated signaling. Meanwhile, the terminal device, when being in the RRC connected state, may switch among different BWPs through Downlink Control Information (DCI). After a carrier in the inactive state enters an active state, the first activated BWP is a first activated BWP configured in the RRC dedicated signaling.

The configuration of BWPs is based on a granularity of a serving cell, and the network side may configure dedicated BWPs of one or more serving cells for a terminal device. For each serving cell, one or more dedicated BWPs (e.g. up to 4 uplink BWPs and up to 4 downlink BWPs) may be configured for the serving cell, and only one dedicated BWP may be activated at a time (e.g. one uplink BWP and/or one downlink BWP is activated). For a serving cell, if the serving cell is configured with a plurality of dedicated BWPs, its activated dedicated BWP may be switched among the plurality of dedicated BWPs.

However, the activated dedicated BWPs of the serving cells may be different, which may result in changes of whether measurement for a frequency point requires a measurement gap. In other words, the number of frequency points measured using a measurement gap may also change. Therefore, configuring the measurement gap according to a UE granularity results in poor flexibility, and how to configure the measurement gap and how to select measurement gap need to be further improved.

In view of this, the following technical solution of the embodiments in the present disclosure is proposed. It should be noted that the network device in the embodiments of the present disclosure may be, but is not limited to, a base station, and the network device may also be other device with control function.

FIG. 7 is a schematic flowchart of a method for configuring a measurement gap provided by an embodiment of the present disclosure. As illustrated in FIG. 7, the method for configuring a measurement gap includes the following operation 701.

At block 701, a network device transmits first configuration information to a terminal device, and the terminal device receives the first configuration information from the network device. The first configuration information is used for determining at least one pre-configured measurement gap, and each of the at least one pre-configured measurement gap is associated with a measurement gap index.

In some optional implementations, the first configuration information is carried in an RRC dedicated signaling.

For example, the network device configures at least one pre-configured measurement gap for the terminal device through the RRC dedicated signaling. Each pre-configured measurement gap configuration is used to determine a type of measurement gap (or gap pattern), and each pre-configured measurement gap configuration is associated with a measurement gap index. It can also be understood that each measurement gap (or gap pattern) is associated with a measurement gap index. Here, the measurement gap index may be a gap index or a gap pattern identifier (id) or the like.

In embodiments of the present disclosure, the determination (or selection) of the measurement gap is carried out according to a granularity of BWP, so that flexible application of the measurement gap can be realized. The following explains how to determine associated measurement gaps with different types of BWPs.

First Solution: Dedicated BWP

In embodiments of the present disclosure, for a dedicated BWP, its associated measurement gap may be determined in the following manner.

Manner 1-1: the network device transmits second configuration information to the terminal device, and the terminal device receives the second configuration information from the network device. The second configuration information includes at least one serving cell configuration, each of the at least one serving cell configuration includes at least one dedicated band width part (BWP) configuration, and each dedicated BWP in at least part of the at least one dedicated BWP is associated with a measurement gap index. The terminal device determines a measurement gap associated with the dedicated BWP in the at least part dedicated BWP based on the first configuration information and the second configuration information.

In some optional implementations, the second configuration information is carried in an RRC dedicated signaling.

In some optional implementations, the measurement gap index associated with the dedicated BWP may be carried in a dedicated BWP configuration corresponding to the dedicated BWP.

For example, the network device configures at least one serving cell configuration for the terminal device through RRC dedicated signaling. Each serving cell configuration includes at least one dedicated BWP configuration, and each dedicated BWP configuration is associated with a measurement gap index. Here, the measurement gap index may be a gap index or a gap pattern id or the like. For example, if the network device configures 4 serving cell configurations for the terminal device through the RRC dedicated signaling, and each serving cell configuration includes 4 dedicated BWP configurations, then there are a total of 16 dedicated BWP configurations, and each of the 16 dedicated BWP configurations carries a measurement gap index for associating the dedicated BWP that is determined by the dedicated BWP configuration.

In the above solution, optionally, the dedicated BWP may be a downlink BWP or an uplink BWP.

Manner 1-2: in response to that a second dedicated BWP is not configured with an associated pre-configured measurement gap, the terminal device determines a measurement gap associated with the second dedicated BWP based on a measurement configuration in an RRC connection reconfiguration message; or in response to that the second dedicated BWP is configured with the associated pre-configured measurement gap, the terminal device determines a pre-configured measurement gap associated with the second dedicated BWP as a measurement gap for the second dedicated BWP.

Here, the measurement configuration in the RRC connection reconfiguration message may also be referred to as a MeasConfig, such as a MeasConfig in R15. It should be noted that the network device will configure a measurement gap through MeasConfig in the RRC connection reconfiguration message.

For example, when the terminal device is switched to a dedicated BWP, if the dedicated BWP is configured with an associated pre-configured measurement gap, the terminal device takes the pre-configured measurement gap as a measurement gap associated with the dedicated BWP and ignores a measurement gap configured in the MeasConfig. If the dedicated BWP is not configured with the associated pre-configured measurement gap, the terminal device takes the measurement gap configured in the MeasConfig as the measurement gap associated with the dedicated BWP.

Second Solution: Initial BWP

In embodiments of the present disclosure, an initial BWP may be default or indicated by a network device. For the initial BWP, its associated measurement gap may be determined in the following manner.

Manner 2-1: the network device transmits third configuration information to the terminal device, and the terminal device receives the third configuration information from the network device. The third configuration information is used for determining a first measurement gap, the first measurement gap being a measurement gap associated with an initial BWP, The terminal device determines the measurement gap associated with the initial BWP as the first measurement gap based on the third configuration information.

In some optional implementations, the third configuration information further includes first indication information, the first indication information being used for indicating that the first measurement gap is the measurement gap associated with the initial BWP.

In some optional implementations, the third configuration information is carried in a system broadcast message; or the third configuration information is carried in an RRC dedicated signaling. Here, the system broadcast message is, for example, an SIB1.

For example, the network device configures a measurement gap (i.e. a first measurement gap) in the SIB1 and indicates that the measurement gap is a measurement gap associated with the initial BWP. Here, the first measurement gap may also be understood as a measurement gap activated or enabled when the terminal device is switched to the initial BWP. The switching of the terminal device to the initial BWP may also be understood as the initial BWP is activated.

For example, the network device configures a measurement gap (i.e. the first measurement gap) through RRC dedicated signaling and indicates that the measurement gap is a measurement gap associated with the initial BWP. Here, the first measurement gap may also be understood as a measurement gap activated or enabled when the terminal device is switched to the initial BWP. The switching of the terminal device to the initial BWP may also be understood as the initial BWP is activated.

Manner 2-2: the terminal device determines a measurement gap associated with a first BWP based on a measurement configuration in an RRC connection reconfiguration message. The first BWP is an initial BWP.

Here, the measurement configuration in the RRC connection reconfiguration message may also be referred to as a MeasConfig, such as a MeasConfig in R15. It should be noted that the network device will configure a measurement gap through the MeasConfig in the RRC connection reconfiguration message. The measurement gap associated with the initial BWP is a measurement gap that is configured in the measurement configuration in the RRC connection reconfiguration message, which may be default or indicated by the network device.

Manner 2-3: the terminal device determines a measurement gap associated with a first BWP based on a measurement gap associated with a default BWP. The first BWP is an initial BWP.

Here, the default BWP may be default or indicated by the network device. When the terminal device is switched to the initial BWP, the terminal device may use the measurement gap associated with the default BWP. A measurement gap associated with the initial BWP is a measurement gap associated with the default BWP, which may be default or indicated by the network device.

Manner 2-4: the terminal device determines a measurement gap associated with a first BWP based on a measurement gap associated with the first dedicated BWP. The first BWP is an initial BWP.

In some optional implementations, a dedicated BWP configuration corresponding to the first dedicated BWP carries second indication information, the second indication information being used for indicating that a pre-configured measurement gap associated with the first dedicated BWP is also a measurement gap associated with the first BWP.

For example, when the terminal device is switched to the initial BWP, a measurement gap associated with the initial BWP borrows or makes uses of a measurement gap associated with a certain dedicated BWP.

Third Solution: Dedicated BWP not Configured with an Associated Pre-Configured Measurement Gap In embodiments of the present disclosure, for a dedicated BWP not configured with an associated pre-configured measurement gap, its associated measurement gap may be determined in the following manner.

Manner 3-1: the terminal device determines a measurement gap associated with a first BWP based on a measurement configuration in an RRC connection reconfiguration message. The first BWP is a dedicated BWP that is not configured with an associated pre-configured measurement gap.

Here, the measurement configuration in the RRC connection reconfiguration message may also be referred to as a MeasConfig, such as a MeasConfig in R15. It should be noted that the network device will configure a measurement gap through the MeasConfig in the RRC connection reconfiguration message. When the terminal device is switched to a dedicated BWP, if the dedicated BWP is not configured with an associated pre-configured measurement gap, the terminal device takes the measurement gap configured in the MeasConfig as a measurement gap associated with the dedicated BWP.

Manner 3-2: the terminal device determines a measurement gap associated with a first BWP based on a measurement gap associated with a default BWP. The first BWP is a dedicated BWP that is not configured with an associated pre-configured measurement gap.

Here, the default BWP may be default or indicated by the network device. When the terminal device is switched to a dedicated BWP, if the dedicated BWP is not configured with an associated pre-configured measurement gap, the terminal device may take the measurement gap associated with the default BWP as a measurement gap associated with the dedicated BWP.

Manner 3-3: the terminal device determines a measurement gap associated with a first BWP based on a pre-configured measurement gap associated with the first dedicated BWP. The first BWP is a dedicated BWP that is not configured with an associated pre-configured measurement gap.

In some optional implementations, a dedicated BWP configuration corresponding to the first dedicated BWP carries second indication information, the second indication information being used for indicating that the pre-configured measurement gap associated with the first dedicated BWP is also the measurement gap associated with the first BWP.

For example, when the terminal device is switched to a dedicated BWP, if the dedicated BWP is not configured with an associated pre-configured measurement gap, the terminal device borrows or takes the pre-configured measurement gap associated with the first dedicated BWP as a measurement gap associated with the dedicated BWP.

Fourth Solution: Dormant BWP

In embodiments of the present disclosure, a dormant BWP has no associated measurement gap, and it is forbidden to configure a pre-configured measurement gap for the dormant BWP.

In embodiments of the present disclosure, the reference timing of the pre-configured measurement gap may be determined in the following manners.

Manner A: in some optional implementations, timing information of the pre-configured measurement gap is determined in accordance with timing information of a primary cell (PCell) or a primary secondary cell (PScell).

Manner B: in some optional implementations, the timing information of the pre-configured measurement gap is determined in accordance with timing information of a first serving cell, the first serving cell being determined based on a configuration from a network device. For example, the network device configures an identification of the first serving cell, and the timing information for indicating the pre-configured measurement gap is determined in accordance with the timing information of the first serving cell.

Manner C: the timing information of the pre-configured measurement gap is determined in accordance with timing information of a serving cell where a dedicated BWP associated with the pre-configured measurement gap is located.

In embodiments of the present disclosure, each of the at least one pre-configured measurement gap corresponds to a priority. Indication information for indicating a priority of the pre-configured measurement gap is carried in configuration information of the pre-configured measurement gap. Alternatively, the indication information for indicating the priority of the pre-configured measurement gap is carried in a dedicated BWP configuration associated with the pre-configured measurement gap.

For example, the network device configures at least one pre-configured measurement gap to the terminal device through the RRC dedicated signaling. Each pre-configured measurement gap is configured with a priority. The higher the priority of a pre-configured measurement gap, the more priority the pre-configured measurement gap is activated or enabled.

For example, the network device configures at least one pre-configured measurement gap to the terminal device through the RRC dedicated signaling, and the network device configures at least one dedicated BWP through RRC dedicated signaling, each dedicated BWP being associated with a pre-configured measurement gap and a priority indication indicating the pre-configured measurement gap. The higher the priority of a pre-configured measurement gap, the more priority the pre-configured measurement gap is activated or enabled.

In some optional implementations, the priority of the pre-configured measurement gap is changed by a first instruction, the first instruction being carried in downlink control information (DCI) or a media access control (MAC) control unit (CE). That is to say, the priority of the pre-configured measurement gap may be dynamically changed by instructions carried in DCI or MAC CE.

In embodiments of the present disclosure, the priority of the measurement gap determined by the measurement configuration in the RRC connection reconfiguration message may also be determined. For example, the priority of the measurement gap configured in the MeasConfig is defaulted to the lowest or highest, or a priority indication is configured for the measurement gap configured in the MeasConfig.

In embodiments of the present disclosure, the terminal device is configured with a plurality of serving cells, and the plurality of serving cells correspond to a plurality of activated BWPs. Each of the plurality of activated BWPs is associated with a measurement gap. How to determine a final activated or enabled measurement gap needs to be clearly defined, which is explained below.

In embodiments of the present disclosure, the terminal device selects at least one measurement gap from a plurality of measurement gaps as an activated or enabled measurement gap based on a priority of a measurement gap associated with each of the plurality of activated BWPs.

Solution I): the pre-configured measurement gap configured in the first configuration information is a measurement gap per UE.

The terminal device selects a measurement gap with a highest priority from the plurality of measurement gaps as the activated or enabled measurement gap based on the priority of the measurement gap associated with each of the plurality of activated BWPs.

It should be noted that the dormant BWP has no associated measurement gap. If a cell is in a dormant BWP, the dormant BWP does not participate in contention of measurement gap selection.

In some optional implementations, for multiple activated BWPs, it is not required that all of them have associated measurement gaps. For an activated BWP with no associated measurement gap, it does not participate in the contention of measurement gap selection. For example, there are four activated BWPs, of which BWP1 is associated with gap1, BWP2 is associated with gap2, BWP3 is associated with gap3, and BWP4 has no associated gap. Then, a gap with the highest priority is selected from gap1, gap2 and gap3 as the final activated or enabled measurement gap.

In some optional implementations, for a plurality of activated BWPs, all BWPs have associated measurement gaps. A manner for determining measurement gaps associated with BWPs may refer to the aforementioned related solutions, and all BWPs participate in the contention for measurement gap selection. For example, there are four activated BWPs, of which BWP1 is associated with gap1, BWP2 is associated with gap2, BWP3 is associated with gap3, and BWP4 is associated with gap4. Then, a gap with the highest priority is selected from gap1, gap2, gap3 and gap4 as the final activated or enabled measurement gap.

Solution II): the pre-configured measurement gap configured in the first configuration information is a measurement gap per FR.

The terminal device determines a first activated BWP list associated with an FR1 pre-configured measurement gap and a second activated BWP list associated with an FR2 pre-configured measurement gap from the plurality of activated BWPs. The terminal device selects one measurement gap from the first activated BWP list as an activated or enabled FR1 measurement gap based on a priority of a measurement gap associated with each activated BWP in the first activated BWP list. The terminal device selects one measurement gap from the second activated BWP list as an activated or enabled FR2 measurement gap based on a priority of a measurement gap associated with each activated BWP in the second activated BWP list.

In some optional implementations, the first configuration information includes a first pre-configured measurement gap list and a second pre-configured measurement gap list, the first pre-configured measurement gap list including one or more FR1 pre-configured measurement gaps, and the second pre-configured measurement gap list including one or more FR2 pre-configured measurement gaps. Here, the first pre-configured measurement gap list may also be referred to as FR1 gap list and the second pre-configured measurement gap list may also be referred to as FR2 gap list.

The first pre-configured measurement gap list is associated with an FR1 indication, the FR1 indication being used for indicating that each pre-configured measurement gap in the first pre-configured measurement gap list belongs to the FR1 pre-configured measurement gap. The second pre-configured measurement gap list is associated with an FR2 indication, the FR2 indication being used for indicating that each pre-configured measurement gap in the second pre-configured measurement gap list belongs to the FR2 pre-configured measurement gap. A numbering range of measurement gap indexes of the FR1 pre-configured measurement gaps in the first pre-configured measurement gap list all overlaps, partially overlaps or does not overlap with a numbering range of measurement gap indexes of the FR2 pre-configured measurement gaps in the second pre-configured measurement gap list.

It should be noted that the above FR1 indication and FR2 indication may be indicated explicitly or implicitly. For example, the FR1 indication and the FR2 indication may be carried in the first configuration information.

Since the first pre-configured measurement gap list is associated with the FR1 indication and the second pre-configured measurement gap list is associated with the FR2 indication, the measurement gap indexes of respective pre-configured measurement gap in the first pre-configured measurement gap list and the measurement gap indexes of respective pre-configured measurement gap in the second pre-configured measurement gap list may be used in an overlapping manner. In order to distinguish whether a measurement gap index indicates a pre-configured measurement gap in the first pre-configured measurement gap list or a pre-configured measurement gap in the second pre-configured measurement gap list, a dedicated BWP is associated with an indication in addition to a measurement gap index. The indication is the FR1 indication or the FR2 indication, and the indication is used for determining whether a pre-configured measurement gap indicated by a pre-configured measurement gap index associated with the dedicated BWP is an FR1 pre-configured measurement gap or an FR2 pre-configured measurement gap.

In some optional implementations, the first configuration information includes a pre-configured measurement gap list, the pre-configured measurement gap list including one or more FR1 pre-configured measurement gaps and one or more FR2 pre-configured measurement gaps.

Each FR1 pre-configured measurement gap in the pre-configured measurement gap list is associated with a measurement gap index, and each FR2 pre-configured measurement gap is also associated with a measurement gap index.

The numbering range of measurement gap indexes of the FR1 pre-configured measurement gaps does not overlap with the numbering range of measurement gap indexes of the FR2 pre-configured measurement gaps in the pre-configured measurement gap list.

After the final activated or enabled measurement gap is selected according to the above solution, the activated or enabled measurement gap is reselected under trigger of at least one of the following events.

First event: a secondary cell is activated and a first activated BWP is not a dormant BWP.

Second event: the secondary cell is activated and the first activated BWP is configured with an associated pre-configured measurement gap.

Third event: the secondary cell is activated, the first activated BWP is not the dormant BWP and the first activated BWP is configured with the associated pre-configured measurement gap.

Fourth event: the secondary cell is deactivated and a currently activated BWP is not the dormant BWP.

Fifth event: the secondary cell is deactivated and the currently activated BWP is configured with an associated pre-configured measurement gap.

Sixth event: the secondary cell is deactivated, the currently activated BWP is not the dormant BWP and the currently activated BWP is configured with the associated pre-configured measurement gap.

Seventh event: an activated BWP of the secondary cell is switched from a source BWP to a target BWP, the target BWP being a dormant BWP and the source BWP being configured with an associated pre-configured measurement gap.

Eighth event: the activated BWP of the secondary cell is switched from the source BWP to the target BWP, the source BWP being a dormant BWP and the target BWP being configured with an associated pre-configured measurement gap.

Ninth event: the activated BWP of a serving cell is switched from a source BWP to a target BWP, one of the source BWP and the target BWP being configured with an associated pre-configured measurement gap.

Tenth event: the activated BWP of the serving cell is switched from the source BWP to the target BWP, both the source BWP and the target BWP are configured with associated pre-configured measurement gaps and a pre-configured measurement gap for the source BWP is different with a pre-configured measurement gap for the target BWP.

According to the above technical solution, a network device pre-configures at least one pre-configured measurement gap through first configuration information, and configuration of a measurement gap configuration according to BWP granularity can be realized through the pre-configured measurement gap, so that an application of the measurement gap is flexible and effective.

The technical solution of the embodiments of the present disclosure realizes the pre-configuration of the measurement gap, and clarifies how to determine for a plurality of types of BWP their associated measurement gap and sets a priority of a measurement gap according to the measurement gap. In this way, the final selected measurement gap can be determined according to the priority of the measurement gap, and thus the application of the measurement gap is flexible and effective.

Figure 8:
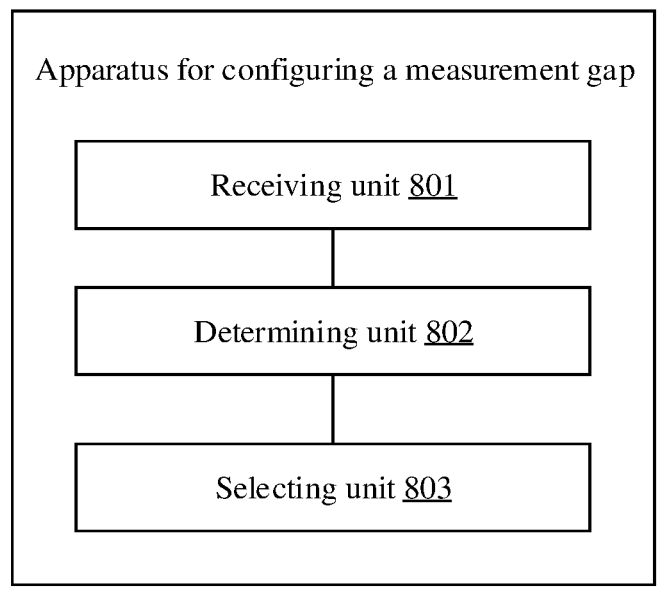
FIG. 8 is a first schematic structural composition diagram of an apparatus for configuring a measurement gap provided by the embodiment of the present disclosure.

FIG. 8 is a first structural composition diagram of an apparatus for configuring a measurement gap provided by an embodiment of the present disclosure, and the apparatus is applied to a terminal device. As illustrated in FIG. 8, the apparatus for configuring a measurement gap includes a receiving unit 801.

The receiving unit 801 is configured to receive first configuration information from a network device. The first configuration information is used for determining at least one pre-configured measurement gap, and each of the at least one pre-configured measurement gap is associated with a measurement gap index.

In some optional implementations, the first configuration information is carried in an RRC dedicated signaling.

In some optional implementations, the receiving unit 801 is further configured to receive second configuration information from the network device. The second configuration information includes at least one serving cell configuration, each of the at least one serving cell configuration includes at least one dedicated band width part (BWP) configuration, and each dedicated BWP in at least part of the at least one dedicated BWP is associated with a measurement gap index.

The apparatus further includes a determining unit 802. The determining unit 802 is configured to determine a measurement gap associated with the dedicated BWP in the at least part dedicated BWP based on the first configuration information and the second configuration information.

In some optional implementations, the second configuration information is carried in an RRC dedicated signaling.

In some optional implementations, the receiving unit 801 is further configured to receive third configuration information from the network device. The third configuration information is used for determining a first measurement gap, the first measurement gap being a measurement gap associated with an initial BWP.

The apparatus further includes a determining unit 802. The determining unit 802 is configured to determine the measurement gap associated with the initial BWP as the first measurement gap based on the third configuration information.

In some optional implementations, the third configuration information further includes first indication information, the first indication information being used for indicating that the first measurement gap is the measurement gap associated with the initial BWP.

In some optional implementations, the third configuration information is carried in a system broadcast message; or the third configuration information is carried in an RRC dedicated signaling.

In some optional implementations, the apparatus further includes a determining unit 802.

The determining unit 802 is configured to determine a measurement gap associated with a first BWP based on a measurement configuration in an RRC connection reconfiguration message.

In some optional implementations, the apparatus further includes a determining unit 802.

The determining unit 802 is configured to determine a measurement gap associated with a first BWP based on a measurement gap associated with a default BWP.

In some optional implementations, the apparatus further includes a determining unit 802.

The determining unit 802 is configured to determine a measurement gap associated with a first BWP based on a pre-configured measurement gap associated with a first dedicated BWP.

In some optional implementations, a dedicated BWP configuration corresponding to the first dedicated BWP carries second indication information, the second indication information being used for indicating that the pre-configured measurement gap associated with the first dedicated BWP is also the measurement gap associated with the first BWP.

In some optional implementations, the first BWP is an initial BWP; or the first BWP is a dedicated BWP that is not configured with an associated pre-configured measurement gap.

In some optional implementations, the apparatus further includes a determining unit 802.

The determining unit 802 is configured to determine a measurement gap associated with the second dedicated BWP based on a measurement configuration in an RRC connection reconfiguration message in response to that a second dedicated BWP is not configured with an associated pre-configured measurement gap; or determine the pre-configured measurement gap associated with the second dedicated BWP as a measurement gap for the second dedicated BWP in response to that the second dedicated BWP is configured with the associated pre-configured measurement gap.

In some optional implementations, timing information of the pre-configured measurement gap is determined in accordance with timing information of a primary cell (PCell) or a primary secondary cell (PScell); or timing information of the pre-configured measurement gap is determined in accordance with timing information of a first serving cell, the first serving cell being determined based on a configuration from the network device; or timing information of the pre-configured measurement gap is determined in accordance with timing information of a serving cell where a dedicated BWP associated with the pre-configured measurement gap is located.

In some optional implementations, each of the at least one pre-configured measurement gap corresponds to a priority.

Indication information for indicating a priority of the pre-configured measurement gap is carried in configuration information of the pre-configured measurement gap; or indication information for indicating the priority of the pre-configured measurement gap is carried in a dedicated BWP configuration associated with the pre-configured measurement gap.

In some optional implementations, the priority of the pre-configured measurement gap is changed by a first instruction, the first instruction being carried in downlink control information (DCI) or a media access control (MAC) control unit (CE).

In some optional implementations, the terminal device is configured with a plurality of serving cells, and the plurality of serving cells correspond to a plurality of activated BWPs.

The apparatus further includes a selecting unit 803. The selecting unit 803 is configured to select at least one measurement gap from a plurality of measurement gaps as an activated or enabled measurement gap based on a priority of a measurement gap associated with each of the plurality of activated BWPs.

In some optional implementations, the pre-configured measurement gap configured in the first configuration information is a measurement gap per UE.

The selecting unit 803 is configured to select a measurement gap with a highest priority from the plurality of measurement gaps as the activated or enabled measurement gap based on the priority of the measurement gap associated with each of the plurality of activated BWPs.

In some optional implementations, the pre-configured measurement gap configured in the first configuration information is a measurement gap per FR.

The selection unit 803 is configured to determine from the plurality of activated BWPs a first activated BWP list associated with an FR1 pre-configured measurement gap and a second activated BWP list associated with an FR2 pre-configured measurement gap; select one measurement gap from the first activated BWP list as an activated or enabled FR1 measurement gap based on a priority of a measurement gap associated with each activated BWP in the first activated BWP list; and select one measurement gap from the second activated BWP list as an activated or enabled FR2 measurement gap based on a priority of a measurement gap associated with each activated BWP in the second activated BWP list.

In some optional implementations, the first configuration information includes a first pre-configured measurement gap list and a second pre-configured measurement gap list, the first pre-configured measurement gap list including one or more FR1 pre-configured measurement gaps, and the second pre-configured measurement gap list including one or more FR2 pre-configured measurement gaps.

In some optional implementations, the first pre-configured measurement gap list is associated with an FR1 indication, the FR1 indication being used for indicating that each pre-configured measurement gap in the first pre-configured measurement gap list belongs to the FR1 pre-configured measurement gap.

The second pre-configured measurement gap list is associated with an FR2 indication, the FR2 indication being used for indicating that each pre-configured measurement gap in the second pre-configured measurement gap list belongs to the FR2 pre-configured measurement gap.

A numbering range of measurement gap indexes of the FR1 pre-configured measurement gaps in the first pre-configured measurement gap list all overlaps, or partially overlaps, or does not overlap with a numbering range of measurement gap indexes of the FR2 pre-configured measurement gaps in the second pre-configured measurement gap list.

In some optional implementations, a dedicated BWP is associated with an indication, in addition to a measurement gap index. The indication is the FR1 indication or the FR2 indication, the indication is used for determining whether a pre-configured measurement gap indicated by a pre-configured measurement gap index associated with the dedicated BWP is an FR1 pre-configured measurement gap or an FR2 pre-configured measurement gap.

In some optional implementations, the first configuration information includes a pre-configured measurement gap list, the pre-configured measurement gap list including one or more FR1 pre-configured measurement gaps and one or more FR2 pre-configured measurement gaps.

In some optional implementations, each of the FR1 pre-configured measurement gaps in the pre-configured measurement gap list is associated with a measurement gap index, and each of the FR2 pre-configured measurement gaps is also associated with a measurement gap index.

A numbering range of measurement gap indexes of the FR1 pre-configured measurement gaps does not overlap with a numbering range of measurement gap indexes of the FR2 pre-configured measurement gaps in the pre-configured measurement gap list.

In some optional implementations, the activated or enabled measurement gap is reselected under trigger of at least one of the following events:

a secondary cell is activated and a first activated BWP is not a dormant BWP;

the secondary cell is activated and the first activated BWP is configured with an associated pre-configured measurement gap;

the secondary cell is activated, the first activated BWP is not the dormant BWP and the first activated BWP is configured with the associated pre-configured measurement gap;

the secondary cell is deactivated and a currently activated BWP is not the dormant BWP;

the secondary cell is deactivated and the currently activated BWP is configured with an associated pre-configured measurement gap;

the secondary cell is deactivated, the currently activated BWP is not the dormant BWP and the currently activated BWP is configured with the associated pre-configured measurement gap;

an activated BWP of the secondary cell is switched from a source BWP to a target BWP, the target BWP being a dormant BWP and the source BWP being configured with an associated pre-configured measurement gap;

the activated BWP of the secondary cell is switched from the source BWP to the target BWP, the source BWP being a dormant BWP and the target BWP being configured with an associated pre-configured measurement gap;

the activated BWP of a serving cell is switched from a source BWP to a target BWP, one of the source BWP and the target BWP being configured with an associated pre-configured measurement gap; or the activated BWP of the serving cell is switched from the source BWP to the target BWP, both the source BWP and the target BWP are configured with associated pre-configured measurement gaps and a pre-configured measurement gap for the source BWP is different with a pre-configured measurement gap for the target BWP.

It will be understood by those skilled in the art that the above description of the apparatus for configuring a measurement gap of the embodiments of the present disclosure may be understood with reference to the description of the method for configuring a measurement gap of the embodiments of the present disclosure.

FIG. 9 is a second structural composition diagram of an apparatus for configuring a measurement gap provided by an embodiment of the present disclosure, and the apparatus is applied to a network device. As illustrated in FIG. 9, the apparatus for configuring a measurement gap includes a transmitting unit 901.

The transmitting unit 901 is configured to transmit first configuration information to a terminal device. The first configuration information is used for determining at least one pre-configured measurement gap, and each of the at least one pre-configured measurement gap is associated with a measurement gap index.

In some optional implementations, the first configuration information is carried in an RRC dedicated signaling.

In some optional implementations, the transmitting unit 901 is further configured to transmit second configuration information to the terminal device. The second configuration information includes at least one serving cell configuration, each of the at least one serving cell configuration includes at least one dedicated band width part (BWP) configuration, and each dedicated BWP in at least part of the at least one dedicated BWP is associated with a measurement gap index.

In some optional implementations, the second configuration information is carried in an RRC dedicated signaling.

In some optional implementations, the transmitting unit 901 is further configured to transmit third configuration information to the terminal device. The third configuration information is used for determining a first measurement gap, the first measurement gap being a measurement gap associated with an initial BWP.

In some optional implementations, the third configuration information further includes first indication information, the first indication information being used for indicating that the first measurement gap is the measurement gap associated with the initial BWP.

In some optional implementations, the third configuration information is carried in a system broadcast message; or the third configuration information is carried in an RRC dedicated signaling.

In some optional implementations, timing information of the pre-configured measurement gap is determined in accordance with timing information of a primary cell (PCell) or a primary secondary cell (PScell); or the timing information of the pre-configured measurement gap is determined in accordance with timing information of a first serving cell, the first serving cell being determined based on a configuration from the network device; or the timing information of the pre-configured measurement gap is determined in accordance with timing information of a serving cell where a dedicated BWP associated with the pre-configured measurement gap is located.

In some optional implementations, each of the at least one pre-configured measurement gap corresponds to a priority; and indication information for indicating a priority of the pre-configured measurement gap is carried in configuration information of the pre-configured measurement gap; or the indication information for indicating the priority of the pre-configured measurement gap is carried in a dedicated BWP configuration associated with the pre-configured measurement gap.

In some optional implementations, the priority of the pre-configured measurement gap is changed by a first instruction, the first instruction being carried in downlink control information (DCI) or a media access control (MAC) control unit (CE).

It will be understood by those skilled in the art that the above description of the apparatus for configuring a measurement gap of the embodiment of the present disclosure may be understood with reference to the description of the method for configuring a measurement gap of the embodiment of the present disclosure.

Figure 10:
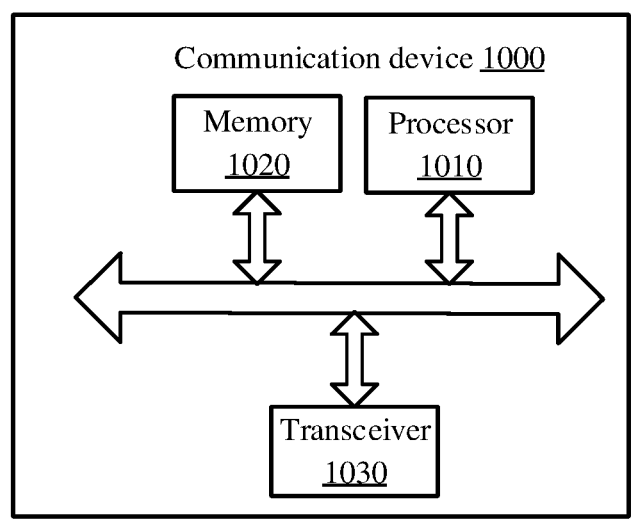
FIG. 10 is a schematic structural diagram of a communication device provided by an embodiment of the present disclosure.

FIG. 10 is a schematic structural diagram of a communication device 1000 provided by an embodiment of the present disclosure. The communication device may be a terminal device or a network device and the communication device 1000 illustrated in FIG. 10 includes a processor 1010 that may call and execute a computer program from a memory to implement the method in the embodiments of the present disclosure.

Optionally, as illustrated in FIG. 10, the communication device 1000 may also include a memory 1020. The processor 1010 may call and execute a computer program from the memory 1020 to implement the method in the embodiments of the present disclosure.

The memory 1020 may be a separate device independent of the processor 1010 or may be integrated in the processor 1010.

Optionally, as illustrated in FIG. 10, the communication device 1000 may also include a transceiver 1030. The processor 1010 may control the transceiver 1030 to communicate with other devices, and in particular send information or data to other devices, or receive information or data sent by other devices.

The transceiver 1030 may include a transmitter and a receiver. The transceiver 1030 may further include antennas. The number of antennas may be one or more.

Optionally, the communication device 1000 may be specifically a network device of the embodiments of the present disclosure, and the communication device 1000 may implement corresponding processes implemented by the network device in various methods of the embodiments of the present disclosure, which will not be repeated here for the sake of brevity.

Optionally, the communication device 1000 may be specifically a mobile terminal/terminal device of the embodiments of the present disclosure, and the communication device 1000 may implement corresponding processes implemented by the mobile terminal/the terminal device in various methods of the embodiments of the present disclosure, which will not be repeated here for the sake of brevity.

Figure 11:
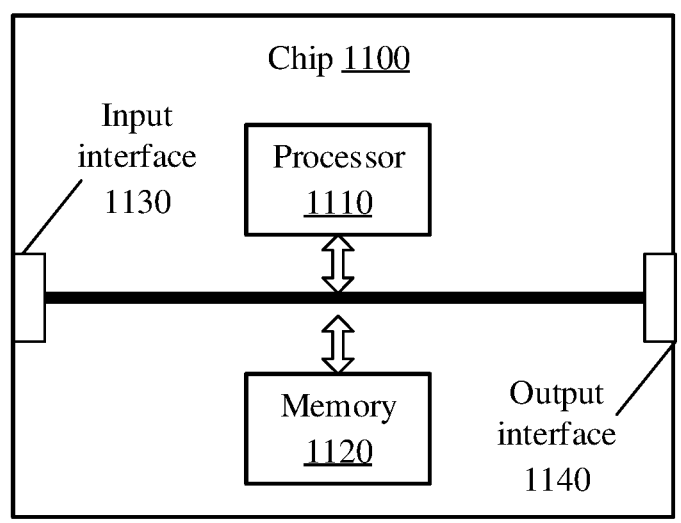
FIG. 11 is a schematic structural diagram of a chip according to an embodiment of the present disclosure.

FIG. 11 is a schematic structural diagram of a chip according to an embodiment of the present disclosure. A chip 1100 illustrated in FIG. 11 includes a processor 1110 that may call and execute a computer program from memory to implement the method in the embodiments of the present disclosure.

Optionally, as illustrated in FIG. 11, the chip 1100 may also include a memory 1120. The processor 1110 may call and execute a computer program from the memory 1120 to implement the method in the embodiments of the present disclosure.

The memory 1120 may be a separate device independent of the processor 1110 or may be integrated in the processor 1110.

Optionally, the chip 1100 may also include an input interface 1130. The processor 1110 may control the input interface 1130 to communicate with other devices or chips, and in particular obtain information or data sent by other devices or chips.

Optionally, the chip 1100 may also include an output interface 1140. The processor 1110 may control the output interface 1140 to communicate with other devices or chips, and in particular output information or data to other devices or chips.

Optionally, the chip may be applied to a network device of the embodiments of the present disclosure, and the chip may implement corresponding processes implemented by the network device in various methods of the embodiments of the present disclosure, which will not be repeated here for the sake of brevity.

Optionally, the chip may be applied to a mobile terminal/terminal device of an embodiment of the present disclosure, and the chip may implement corresponding processes implemented by the mobile terminal/the terminal device in the respective methods of the embodiments of the present disclosure, which will not be repeated here for the sake of brevity.

It should be understood that the chip referred to in the embodiments of the present disclosure may also be referred to as a system-level chip, a system chip, a chip system or a system-on-chip or the like.

Figure 12:
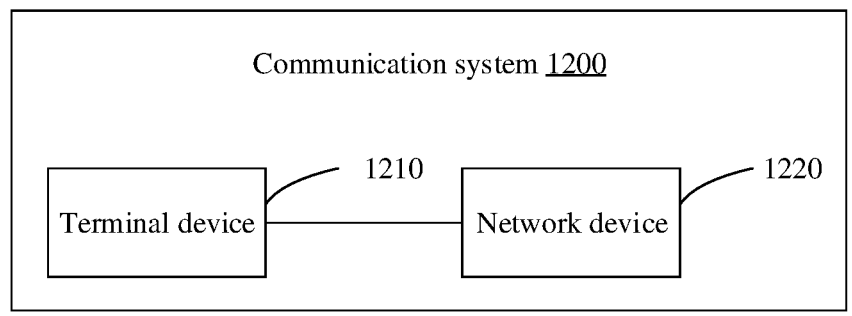
FIG. 12 is a schematic block diagram of a communication system provided by an embodiment of the present disclosure.

FIG. 12 is a schematic block diagram of a communication system 1200 provided by an embodiment of the present disclosure. As illustrated in FIG. 12, the communication system 1200 includes a terminal device 1210 and a network device 1220.

The terminal device 1210 may be configured to implement corresponding functions implemented by the terminal device in the above method, and the network device 1220 may be configured to implement corresponding functions implemented by the network device in the above method, which will not be repeated here for the sake of brevity.

It should be understood that the processor may be an integrated circuit chip having signal processing capability. In implementation, the operations of the above method embodiments may be accomplished by integrated logic circuitry of hardware in processor or instructions in the form of software. The processor may be a general purpose processor, a digital signal processor (DSP), an application specific integrated circuit (ASIC), a field programmable gate array (FPGA) or other programmable logic devices, discrete gates or transistor logic devices, or discrete hardware components. The processor may implement or execute the methods, operations and logic diagrams disclosed in the embodiments of the present disclosure. The general purpose processor may be a microprocessor or any conventional processor. The operations of the method disclosed in the embodiments of the present disclosure may be directly embodied as being executed by a hardware decoding processor or being executed by the hardware and software modules in a decoding processor. The software modules may be located in a random access memory, a flash memory, a read-only memory, a programmable read-only memory or an electrically erasable programmable memory, a register and other mature storage media in the art. The storage medium is located in the memory, and the processor reads the information in the memory to complete the operations of the aforementioned method in conjunction with its hardware.

It will be appreciated that the memory in the embodiments of the present disclosure may be a volatile memory or a non-volatile memory, or may also include both a volatile memory and a non-volatile memory. The non-volatile memory may be a read-only memory (ROM), a programmable ROM (PROM), an erasable PROM (EPROM), an electrically EPROM (EPROM) or a flash memory. The volatile memory may be a random access memory (RAM), which serves as an external cache. By way of illustration but not limitation, many forms of RAM are available, such as a static RAM (SRAM), a dynamic RAM (DRAM), a synchronous DRAM (SDRAM), a double data rate SDRAM (DDR SDRAM), an enhanced SDRAM (ESDRAM), a synchronous link DRAM (SLDRAM), a direct rambus RAM (DR RAM). It should be noted that the memory in the systems and methods described herein is intended to include, but is not limited to, these memories and any other suitable types of memory.

It should be understood that the memory described above is exemplary but not limiting. For example, the memory in the embodiments of the present disclosure may also be a static RAM (SRAM), a dynamic RAM (DRAM), a synchronous DRAM (SDRAM), a double data rate SDRAM (DDR SDRAM), an enhanced SDRAM (ESDRAM), a synchronous link DRAM (SLDRAM), a direct rambus RAM (DR RAM), etc. That is, the memory in the embodiments of the present disclosure is intended to include, but is not limited to, these memories and any other suitable types of memory.

In an embodiment of the present disclosure, there is further provided a computer-readable storage medium, configured to store a computer program.

Optionally, the computer-readable storage medium may be applied to the network device of the embodiments of the present disclosure, and the computer program causes a computer to implement corresponding processes implemented by the network device in the methods of the embodiments of the present disclosure, which will not be repeated here for the sake of brevity.

Optionally, the computer-readable storage medium may be applied to the mobile terminal/terminal device of the embodiments of the present disclosure, and the computer program causes a computer to implement corresponding processes implemented by the mobile terminal/terminal device in the methods of the embodiments of the present disclosure, which will not be repeated here for the sake of brevity.

In an embodiment of the present disclosure, there is further provided a computer program product, which includes computer program instructions.

Optionally, the computer program product may be applied to the network device of the embodiments of the present disclosure, and the computer program instructions cause a computer to implement corresponding processes implemented by the network device in the methods of the embodiments of the present disclosure, which will not be repeated here for the sake of brevity.

Optionally, the computer program product may be applied to the mobile terminal/terminal device of the embodiments of the present disclosure, and the computer program instructions causes a computer to implement corresponding processes implemented by the mobile terminal/terminal device in the methods of the embodiments of the present disclosure, which will not be repeated here for the sake of brevity.

In an embodiment of the present disclosure, there is further provided a computer program.

Optionally, the computer program may be applied to the network device of the embodiments of the present disclosure, and the computer program, when running on a computer, causes the computer to implement corresponding processes implemented by the network device in the methods of the embodiments of the present disclosure, which will not be repeated here for the sake of brevity.

Optionally, the computer program may be applied to the mobile terminal/terminal device of the embodiments of the present disclosure, and the computer program, when running on a computer, causes the computer to implement corresponding processes implemented by the mobile terminal/terminal device in the methods of the embodiments of the present disclosure, which will not be repeated here for the sake of brevity.

Those of ordinary skill in the art may realize that the various example units and algorithm steps described in connection with the embodiments disclosed herein may be implemented in electronic hardware or a combination of computer software and electronic hardware. Whether these functions are performed in hardware or software depends on the specific application and design constraints of the technical solution. Professionals may use different methods for each particular application to implement the described functionality, but such implementation should not be considered beyond the scope of the present disclosure.

Those skilled in the art will clearly appreciate that, for convenience and conciseness of description, the specific operating processes of the above-described systems, apparatuses and units may refer to the corresponding processes in the aforementioned method embodiments and will not be repeated herein.

In several embodiments provided herein, it should be understood that the disclosed systems, apparatuses and methods may be implemented in other manners. For example, the above-described embodiments of the apparatus is only schematic, for example, the division of the units is only a logical function division, and in practice, there may be another division manner, for example, multiple units or components may be combined or integrated into another system, or some features may be ignored or not performed. On the other hand, the coupling or direct coupling or communication connection between each other illustrated or discussed may be indirect coupling or communication connection through some interfaces, devices or units, and may be electrical, mechanical or other form.

The units illustrated as separate elements may or may not be physically separated, and the elements displayed as units may or may not be physical units, i.e. may be located in a place, or may be distributed over a plurality of network units. Part or all of the units may be selected according to the actual needs to achieve the purpose of the embodiments of the present disclosure.

In addition, various functional units in embodiments of the present disclosure may be integrated in one processing unit, each unit may exist physically alone, or two or more units may be integrated in one unit.

When the functions are realized in the form of software functional units and sold or used as an independent product, they may be stored in a computer readable storage medium. Based on such an understanding, the technical solutions according to the disclosure, in essence or the part contributing to the prior art, or part of the technical solutions may be embodied in the form of a software product. The computer software product is stored in a storage medium, and includes several instructions so that a computer device (which may be a personal computer, a server, a network device or the like) implements all or part of the method according to respective embodiments of the disclosure. The aforementioned storage medium includes various media capable of storing a program code such as a USB disk, a mobile hard drive disk, a read-only memory (ROM), a random access memory (RAM), a magnetic disk or an optical disk.

The above is only the specific implementation of the present disclosure, but the scope of protection of the present disclosure is not limited thereto. Any person skilled in the art can easily think of changes or substitutions within the technical scope disclosed in the present disclosure, which should be covered within the protection scope of the present disclosure. Therefore, the scope of protection of the present disclosure shall be subject to the scope of protection of the claims.

The invention claimed is:

1. A method of wireless communication, comprising:
receiving, by a terminal device, first configuration information from a network device, wherein the first configuration information is used for determining at least one pre-configured measurement gap, and each of the at least one pre-configured measurement gap is associated with a measurement gap index, and wherein the terminal device is configured with a plurality of serving cells, and the plurality of serving cells correspond to a plurality of activated bandwidth parts (BWPs); and
selecting, by the terminal device, at least one measurement gap from a plurality of measurement gaps as an activated or enabled measurement gap based on a priority of a measurement gap associated with each of the plurality of activated BWPs.

2. The method of claim 1, wherein the first configuration information is carried in a radio resource control (RRC) dedicated signaling.

3. The method of claim 1, further comprising:
receiving, by the terminal device, second configuration information from the network device, wherein the second configuration information comprises at least one serving cell configuration, each of the at least one serving cell configuration comprises at least one dedicated (BWP configuration, and each dedicated BWP in at least part of the at least one dedicated BWP configuration is associated with a measurement gap index; and
determining, by the terminal device, a measurement gap associated with a dedicated BWP in the at least part of the at least one dedicated BWP configuration based on the first configuration information and the second configuration information.

4. The method of claim 1, wherein:
timing information of the pre-configured measurement gap is determined in accordance with timing information of a primary cell (PCell) or a primary secondary cell (PScell); or
the timing information of the pre-configured measurement gap is determined in accordance with timing information of a first serving cell, the first serving cell being determined based on a configuration from the network device; or
the timing information of the pre-configured measurement gap is determined in accordance with timing information of a serving cell where a dedicated BWP associated with the pre-configured measurement gap is located.

5. The method of claim 1, wherein:
each of the at least one pre-configured measurement gap corresponds to a priority, and
indication information for indicating a priority of the pre-configured measurement gap is carried in configuration information of the pre-configured measurement gap, or the indication information for indicating the priority of the pre-configured measurement gap is carried in a dedicated BWP configuration associated with the pre-configured measurement gap.

6. The method of claim 1, wherein the activated or enabled measurement gap is reselected under a trigger that includes at least one of:
a secondary cell is activated and a first activated BWP is not a dormant BWP;
the secondary cell is activated and the first activated BWP is configured with an associated pre-configured measurement gap;
the secondary cell is activated, the first activated BWP is not the dormant BWP and the first activated BWP is configured with the associated pre-configured measurement gap;
the secondary cell is deactivated and a currently activated BWP is not the dormant BWP;
the secondary cell is deactivated and the currently activated BWP is configured with an associated pre-configured measurement gap;
the secondary cell is deactivated, the currently activated BWP is not the dormant BWP and the currently activated BWP is configured with the associated pre-configured measurement gap;
an activated BWP of the secondary cell is switched from a source BWP to a target BWP, the target BWP being a dormant BWP and the source BWP being configured with an associated pre-configured measurement gap;
the activated BWP of the secondary cell is switched from the source BWP to the target BWP, the source BWP being a dormant BWP and the target BWP being configured with an associated pre-configured measurement gap;
the activated BWP of a serving cell is switched from a source BWP to a target BWP, one of the source BWP and the target BWP being configured with an associated pre-configured measurement gap; or
the activated BWP of the serving cell is switched from the source BWP to the target BWP, both the source BWP and the target BWP are configured with associated pre-configured measurement gaps and a pre-configured measurement gap for the source BWP is different with a pre-configured measurement gap for the target BWP.

7. The method of claim 3, wherein the second configuration information is carried in an RRC dedicated signaling.

8. An apparatus for wireless communication of a terminal device, comprising:
a processor; and
a memory storing instructions, which when executed by the processor, cause the processor to:
receive first configuration information from a network device, wherein the first configuration information is used for determining at least one pre-configured measurement gap, and each of the at least one pre-configured measurement gap is associated with a measurement gap index, and wherein the terminal device is configured with a plurality of serving cells, and the plurality of serving cells correspond to a plurality of activated bandwidth parts (BWPs); and
select at least one measurement gap from a plurality of measurement gaps as an activated or enabled measurement gap based on a priority of a measurement gap associated with each of the plurality of activated BWPs.

9. The apparatus of claim 8, wherein the first configuration information is carried in a radio resource control (RRC) dedicated signaling.

10. The apparatus of claim 8, wherein the memory storing instructions, which when executed by the processor, further cause the processor to:
receive second configuration information from the network device, wherein the second configuration information comprises at least one serving cell configuration, each of the at least one serving cell configuration comprises at least one dedicated BWP configuration, and each dedicated BWP in at least part of the at least one dedicated BWP configuration is associated with a measurement gap index; and
determine a measurement gap associated with a dedicated BWP in the at least part of the at least one dedicated BWP configuration based on the first configuration information and the second configuration information.

11. The apparatus of claim 8, wherein:
timing information of the pre-configured measurement gap is determined in accordance with timing information of a primary cell (PCell) or a primary secondary cell (PScell),
the timing information of the pre-configured measurement gap is determined in accordance with timing information of a first serving cell, the first serving cell being determined based on a configuration from the network device, or
the timing information of the pre-configured measurement gap is determined in accordance with timing information of a serving cell where a dedicated BWP associated with the pre-configured measurement gap is located.

12. The apparatus of claim 8, wherein:

each of the at least one pre-configured measurement gap corresponds to a priority, and indication information for indicating a priority of the pre-configured measurement gap is carried in configuration information of the pre-configured measurement gap, or the indication information for indicating the priority of the pre-configured measurement gap is carried in a dedicated BWP configuration associated with the pre-configured measurement gap.

13. The apparatus of claim 8, wherein the activated or enabled measurement gap is reselected under a trigger that includes at least one of:

a secondary cell is activated and a first activated BWP is not a dormant BWP;

the secondary cell is activated and the first activated BWP is configured with an associated pre-configured measurement gap;

the secondary cell is activated, the first activated BWP is not the dormant BWP and the first activated BWP is configured with the associated pre-configured measurement gap;

the secondary cell is deactivated and a currently activated BWP is not the dormant BWP;

the secondary cell is deactivated and the currently activated BWP is configured with an associated pre-configured measurement gap;

the secondary cell is deactivated, the currently activated BWP is not the dormant BWP and the currently activated BWP is configured with the associated pre-configured measurement gap;

an activated BWP of the secondary cell is switched from a source BWP to a target BWP, the target BWP being a dormant BWP and the source BWP being configured with an associated pre-configured measurement gap;

the activated BWP of the secondary cell is switched from the source BWP to the target BWP, the source BWP being a dormant BWP and the target BWP being configured with an associated pre-configured measurement gap;

the activated BWP of a serving cell is switched from a source BWP to a target BWP, one of the source BWP and the target BWP being configured with an associated pre-configured measurement gap; or the activated BWP of the serving cell is switched from the source BWP to the target BWP, both the source BWP and the target BWP are configured with associated pre-configured measurement gaps and a pre-configured measurement gap for the source BWP is different with a pre-configured measurement gap for the target BWP.

14. An apparatus for wireless communication of a network device, comprising:

a processor; and a memory storing instructions, which when executed by the processor, cause the processor to:

transmit first configuration information to a terminal device, wherein the first configuration information is used for determining at least one pre-configured measurement gap, and each of the at least one pre-configured measurement gap is associated with a measurement gap index; and configure the terminal device with a plurality of serving cells, and the plurality of serving cells correspond to a plurality of activated bandwidth parts (BWPs) such that the terminal device is enabled to select at least one measurement gap from a plurality of measurement gaps as an activated or enabled measurement gap based on a priority of a measurement gap associated with each of the plurality of activated BWPs.

15. The apparatus of claim 14, wherein the first configuration information is carried in a radio resource control (RRC) dedicated signaling.

16. The apparatus of claim 14, wherein the memory storing instructions, which when executed by the processor, further cause the processor to:

transmit second configuration information to the terminal device, wherein the second configuration information comprises at least one serving cell configuration, each of the at least one serving cell configuration comprises at least one dedicated BWP configuration, and each dedicated BWP in at least part of the at least one dedicated BWP is associated with a measurement gap index.

17. The apparatus according to claim 14, wherein:

timing information of the pre-configured measurement gap is determined in accordance with timing information of a primary cell (PCell) or a primary secondary cell (PScell), the timing information of the pre-configured measurement gap is determined in accordance with timing information of a first serving cell, the first serving cell being determined based on a configuration from the network device, or the timing information of the pre-configured measurement gap is determined in accordance with timing information of a serving cell where a dedicated BWP associated with the pre-configured measurement gap is located.

18. The apparatus of claim 14, wherein:

each of the at least one pre-configured measurement gap corresponds to a priority, and indication information for indicating a priority of the pre-configured measurement gap is carried in configuration information of the pre-configured measurement gap, or the indication information for indicating the priority of the pre-configured measurement gap is carried in a dedicated BWP configuration associated with the pre-configured measurement gap.

* * * * *